(12) United States Patent
Inoguchi et al.

(10) Patent No.: US 9,786,169 B2
(45) Date of Patent: Oct. 10, 2017

(54) ON-VEHICLE INFORMATION PROVIDING DEVICE, INFORMATION PROVIDING CENTER, AND INFORMATION PROVIDING SYSTEM

(75) Inventors: Toshio Inoguchi, Nagoya (JP); Tomoyuki Zaitsu, Tokyo (JP); Yasuhiro Tooyama, Gamagori (JP)

(73) Assignees: TOYOTA JIDOSHA KABUSHIKI KAISHA, Toyota-shi (JP); AISIN AW CO., LTD., Anjyo-shi (JP)

( * ) Notice: Subject to any disclaimer, the term of this patent is extended or adjusted under 35 U.S.C. 154(b) by 705 days.

(21) Appl. No.: 12/442,541

(22) PCT Filed: Jan. 24, 2008

(86) PCT No.: PCT/JP2008/050990
§ 371 (c)(1),
(2), (4) Date: Mar. 24, 2009

(87) PCT Pub. No.: WO2008/090956
PCT Pub. Date: Jul. 31, 2008

(65) Prior Publication Data
US 2009/0271102 A1     Oct. 29, 2009

(30) Foreign Application Priority Data
Jan. 26, 2007  (JP) .................................. 2007-016806

(51) Int. Cl.
*G08G 1/0962*    (2006.01)
*G01C 21/32*     (2006.01)
(Continued)

(52) U.S. Cl.
CPC ........... *G08G 1/0962* (2013.01); *G01C 21/32* (2013.01); *G01C 21/3685* (2013.01);
(Continued)

(58) Field of Classification Search
CPC ........... G08G 1/0104; G08G 1/096716; G08G 1/096775; G08G 1/096741; G08G 1/20;
(Continued)

(56) References Cited

U.S. PATENT DOCUMENTS 3,205,479 A    9/1965  Schwarz et al.
5,091,727 A *  2/1992  Mahmood .................. 340/932.2
(Continued)

FOREIGN PATENT DOCUMENTS

JP    07-037130 A    2/1995
JP    07-160992      6/1995
(Continued)

OTHER PUBLICATIONS

JP02004280242A translation.*

*Primary Examiner* — Jeffrey Shapiro
(74) *Attorney, Agent, or Firm* — Andrews Kurth Kenyon LLP

(57) ABSTRACT

An on-vehicle information providing device for providing information to a driver based on information sent from an information providing center is disclosed. When a vehicle leaves an off-street facility having multiple exits to enter a road, the on-vehicle information providing device performs a first process of sending the information providing center vehicle-side information including information obtained based on starting time and exiting time of the vehicle and information identifying one of the exits selected for the vehicle to leave the facility; and performs a second process of receiving from the information providing center exit status information including exit time lengths calculated for the respective exits by the information providing center based on the vehicle-side information received from multiple vehicles and providing information to the driver based on the received exit status information.

12 Claims, 15 Drawing Sheets

(51) Int. Cl.
*G01C 21/36* (2006.01)
*G01C 21/34* (2006.01)
*G08G 1/14* (2006.01)

(52) U.S. Cl.
CPC ..... *G01C 21/3415* (2013.01); *G01C 21/3492* (2013.01); *G08G 1/14* (2013.01)

(58) Field of Classification Search
CPC ....... G08G 1/096827; G08G 1/096844; G08G 1/0969; G08G 5/0013; G08G 5/0043; G08G 5/0082; G08G 5/0026; G08G 5/065; G08G 1/096811; G08G 1/096822; G01C 21/3492; G01C 21/12; G01C 21/36; G01C 21/367; G01C 21/3673; G01C 21/26; G01C 21/32; G01C 21/3415; G06G 7/76; G05D 1/0234; G05D 1/024; G02B 27/01; B60K 37/02; B60K 2350/1064
USPC ........ 701/117–120, 200–202, 204, 207–209, 701/211, 213, 414, 423; 340/995.1–995.28, 932.2
See application file for complete search history.

(56) References Cited

U.S. PATENT DOCUMENTS

| | | | |
|---|---|---|---|
| 5,654,690 A * | 8/1997 | Ishikawa et al. | 340/506 |
| 6,317,042 B1 * | 11/2001 | Engelhorn et al. | 340/539.16 |
| 6,426,708 B1 * | 7/2002 | Trajkovic et al. | 340/932.2 |
| 6,619,212 B1 * | 9/2003 | Stephan | B60L 13/006 104/290 |
| 6,671,619 B2 * | 12/2003 | Kusano et al. | 701/209 |
| 6,747,687 B1 * | 6/2004 | Alves | 348/148 |
| 6,778,071 B2 * | 8/2004 | Megerle | 340/332 |
| 6,865,539 B1 * | 3/2005 | Pugliese, III | 705/5 |
| 7,259,656 B1 * | 8/2007 | Wright | 340/286.14 |
| 7,496,445 B2 * | 2/2009 | Mohsini et al. | 701/206 |
| 2002/0116118 A1 * | 8/2002 | Stallard | G08G 1/01 701/117 |
| 2003/0033083 A1 * | 2/2003 | Nakashima et al. | 701/211 |
| 2003/0060977 A1 * | 3/2003 | Jijina | G01C 21/3415 701/414 |
| 2004/0255297 A1 * | 12/2004 | Horstemeyer | 718/100 |
| 2005/0102075 A1 * | 5/2005 | Dar et al. | 701/29 |
| 2005/0209769 A1 * | 9/2005 | Yamashita et al. | 701/117 |
| 2006/0117186 A1 * | 6/2006 | Yeo | 713/182 |
| 2006/0241857 A1 * | 10/2006 | Onishi et al. | 701/202 |
| 2007/0021907 A1 * | 1/2007 | Kato et al. | 701/207 |
| 2007/0247315 A1 * | 10/2007 | Nagai et al. | 340/572.4 |
| 2008/0033633 A1 * | 2/2008 | Akiyoshi | G01C 21/343 701/418 |
| 2008/0033640 A1 * | 2/2008 | Amano | G01C 21/3476 701/414 |
| 2008/0114542 A1 * | 5/2008 | Nambata | G08G 1/096827 701/533 |
| 2008/0258935 A1 * | 10/2008 | Lee | G06Q 30/0284 340/932.2 |
| 2009/0005961 A1 * | 1/2009 | Grabowski | G01C 21/365 701/532 |
| 2009/0309760 A1 * | 12/2009 | Chew | 340/932.2 |
| 2011/0099126 A1 * | 4/2011 | Belani | G06Q 30/0284 705/418 |

FOREIGN PATENT DOCUMENTS

| | | | |
|---|---|---|---|
| JP | 09134496 A | 5/1997 | |
| JP | 2002-168642 A | 6/2002 | |
| JP | 2004280242 A * | 10/2004 | G08G 1/14 |
| JP | 2005-077126 A | 3/2005 | |
| JP | 2005-196232 A | 7/2005 | |
| JP | 2005-207933 A | 8/2005 | |
| JP | 2005-284699 A | 10/2005 | |
| JP | 2006-031412 A | 2/2006 | |

* cited by examiner

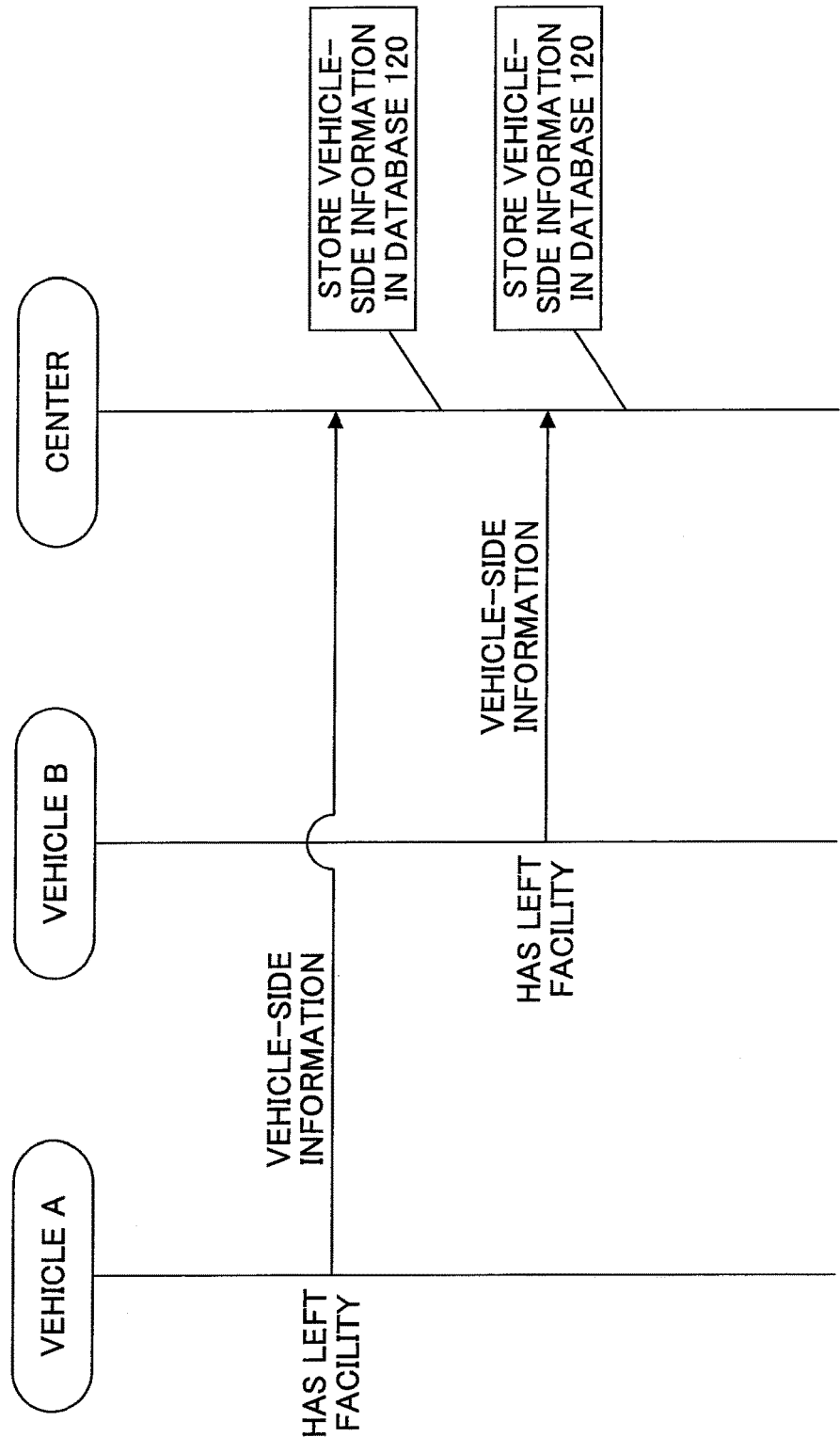

FIG.11A

NUMBER-OF-EXITING-VEHICLES-MANAGEMENT INFORMATION

FACILITY IDENTIFICATION INFORMATION: A0001

| VEHICLE ID | EXIT START TIME |
|---|---|
| 000001 | 2005/10/01 10:15 |
| 000002 | 2005/10/01 10:43 |
| 000023 | 2005/10/01 11:07 |
|  |  |
|  |  |
|  |  |

FIG.11B

PARKING HISTORY INFORMATION

| VEHICLE ID | EXIT START TIME | EXIT COMPLETION TIME | ACTUAL EXIT TIME LENGTH | FACILITY IDENTIFICATION INFORMATION | EXIT NUMBER | NUMBER OF EXITING VEHICLES |
|---|---|---|---|---|---|---|
| 000001 | 2005/10/01 10:15 | 2005/10/01 10:18 | 4 | A0003 | 1 | 20 |
| 000002 | 2005/10/01 10:43 | 2005/10/01 11:02 | 20 | A0003 | 1 | 122 |
| 000023 | 2005/10/01 11:07 | 2005/10/01 11:30 | 24 | A0003 | 2 | 135 |
| 000001 | 2005/10/02 20:08 | 2005/10/02 20:10 | 3 | A0006 | 1 | 4 |
| 000012 | 2005/10/02 15:00 | 2005/10/02 15:18 | 19 | A0003 | 1 | 115 |
| ... | ... | ... | ... | ... | ... | ... |

FIG.11C

AVERAGE EXIT TIME LENGTH INFORMATION RELATIVE TO NUMBERS OF EXITING VEHICLES

| FACILITY IDENTIFICATION INFORMATION | EXIT NUMBER | NUMBER OF EXITING VEHICLES | AVERAGE EXIT TIME LENGTH |
|---|---|---|---|
| A0001 | 1 | 1~10 | 5 MIN |
| | | 10~20 | 12 MIN |
| | | ... | ... |
| | | 51~ | 45 MIN OR MORE |
| | 2 | 1~10 | 10 MIN |
| | | 10~20 | 23 MIN |
| | | ... | ... |
| | | 51~ | 60 MIN OR MORE |
| | 3 | 1~10 | 7 MIN |
| | | 10~20 | 10 MIN |
| | | ... | ... |
| | | 51~ | 30 MIN OR MORE |
| A0002 | 1 | aaa~bbb | A1 MIN |
| | | ccc~ddd | B1 MIN |
| | 2 | aaa~bbb | A2 MIN |
| | | ccc~ddd | B2 MIN |
| A0003 | 1 | xxx~yyy | X MIN |
| ... | ... | ... | ... |

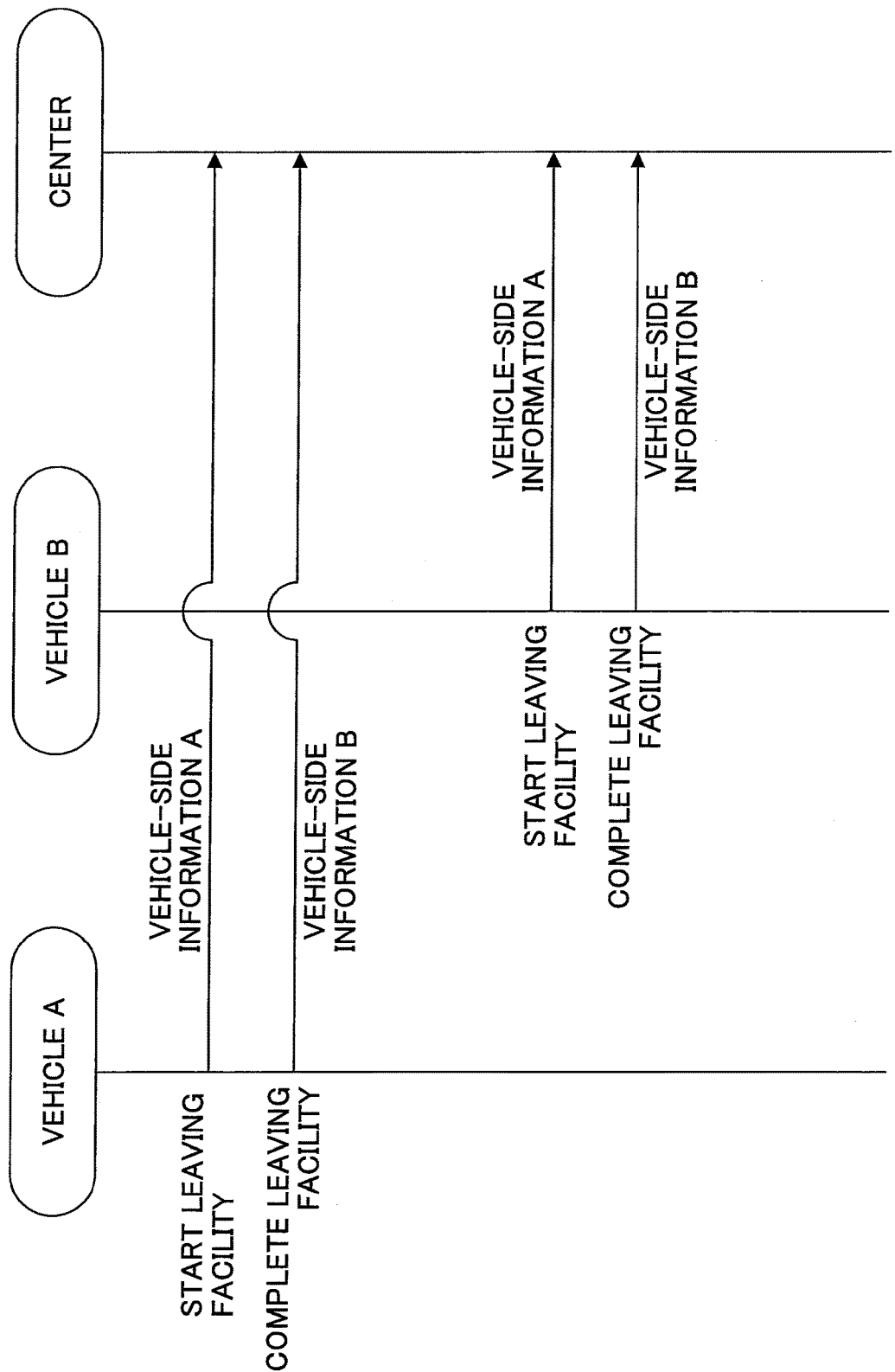

US 9,786,169 B2

ON-VEHICLE INFORMATION PROVIDING DEVICE, INFORMATION PROVIDING CENTER, AND INFORMATION PROVIDING SYSTEM

This is a 371 national phase application of PCT/JP2008/050990 filed 24 Jan. 2008, which claims priority to Japanese Patent Application No. 2007-016806 filed 26 Jan. 2007, the contents of which are incorporated herein by reference.

TECHNICAL FIELD

The present invention relates to an on-vehicle information providing device for providing information to a driver based on information sent from an information providing center, the information providing center for providing information to the on-vehicle information providing device, and an information providing system including the on-vehicle information providing device and the information providing center.

BACKGROUND ART

Various inventions have been made regarding technologies for providing information on the best exit for a vehicle leaving a large parking lot or facility having multiple exits.

For example, patent document 1 discloses a navigation device that selects an exit closest to the current position in linear distance or travel distance as the best exit or selects an exit having a traffic signal or a destination sign at an intersection with a road link as the best exit.

As another example, patent document 2 discloses a guidance method where guidance information including routes to exits of a parking lot is generated by a server and a vehicle in the parking lot is guided via wireless communications between an on-vehicle device and the server. In the disclosed method, respective exits are associated with roads (links) surrounding the parking lot and an exit associated with a link constituting a part of a route to a destination is selected.

[Patent document 1] Japanese Patent Application Publication No. 2002-168642
[Patent document 2] Japanese Patent Application Publication No. 2005-284699

DISCLOSURE OF INVENTION

Problems to be Solved by the Invention

At a large parking lot or facility, congestion frequently occurs at exits. Therefore, in many cases, a driver wants to know an exit that takes minimum time to leave the parking lot or facility rather than an exit closest to the current position in travel distance and an exit having a destination sign.

However, the device disclosed in patent document 1 cannot provide information on an exit requiring a short time to leave taking into account the degrees of congestion at respective exits.

Meanwhile, patent document 2 suggests providing congestion information on exits of a parking lot to an on-vehicle device (paragraph [0028]). However, patent document 2 does not disclose any concrete method or configuration for obtaining congestion information on exits of a parking lot and for providing the congestion information to the on-vehicle device. Also, there is no mention in patent document 2 about providing information on time necessary to leave a parking lot for each of its exits.

Thus, with technologies disclosed in the above patent documents, it is not possible to provide information on time necessary to leave a parking lot or a facility for each of its exits.

One object of the present invention is to solve or reduce one or more problems caused by the limitations and disadvantages of the background art and to provide an on-vehicle information providing device, an information providing center, and an information providing system that make it possible to provide information on time necessary for a vehicle to exit a parking lot or a facility for each of its multiple exits.

Means for Solving the Problems

A first aspect of the present invention provides an on-vehicle information providing device for providing information to a driver based on information sent from an information providing center. When a vehicle leaves an off-street facility having multiple exits to enter a road, the on-vehicle information providing device is configured to perform a first process of sending the information providing center vehicle-side information including information obtained based on starting time and exiting time of the vehicle and information identifying one of the exits selected for the vehicle to leave the facility; and to perform a second process of receiving from the information providing center exit status information including exit time lengths calculated for the respective exits by the information providing center based on the vehicle-side information received from multiple vehicles and providing information to the driver based on the received exit status information. Examples of the off-street facility include a parking lot and a building.

According to the first aspect of the present invention, the on-vehicle information providing device sends the information providing center vehicle-side information including information obtained based on starting time and exiting time of the vehicle and information identifying one of the exits selected for the vehicle to leave the facility, and receives exit time lengths for the respective exits calculated by the information providing center based on the vehicle-side information sent from multiple vehicles. This configuration makes it possible to provide a driver with information on the exit time lengths for the respective exits.

According to the first aspect of the present invention, the second process may include a step of identifying an exit having a shortest exit time length based on the exit status information and reporting the identified exit to the driver.

A second aspect of the present invention provides an on-vehicle information providing device for providing information to a driver based on information sent from an information providing center. When a vehicle leaves an off-street facility having multiple exits to enter a road, the on-vehicle information providing device is configured to perform a first process of sending the information providing center vehicle-side information including information obtained based on starting time and exiting time of the vehicle and information identifying one of the exits selected for the vehicle to leave the facility; and to perform a second process of receiving from the information providing center exit status information including information on an exit having a shortest exit time length which is selected by the information providing center based on the vehicle-side information received from multiple vehicles, and providing information to the driver based on the received exit status information.

According to the first aspect or the second aspect of the present invention, at least one of the first process and the second process may include a step of sending the information providing center facility identification information identifying the facility that the vehicle is to leave; and the exit status information may be generated by the information providing center through a retrieval process based on the facility identification information.

According to the first aspect or the second aspect of the present invention, the second process preferably includes a step of providing the driver with information included in the exit status information and indicating whether each of the exits is congested.

According to the first aspect or the second aspect of the present invention, the on-vehicle information providing device may be configured such that one or both of the first process and the second process can be started and stopped by user operations.

A third aspect of the present invention provides an information providing center for sending and receiving information to and from multiple vehicles. The information providing center is configured to generate, for a vehicle leaving an off-street facility having multiple exits to enter a road, exit status information including exit time lengths for the respective exits based on vehicle-side information received from the vehicles having left the same facility within a predetermined period of time; and to send the generated exit status information to the vehicle leaving the facility to enter the road. The vehicle-side information includes information obtained based on starting time and exiting time of the vehicles and information identifying the exits selected for the vehicles to leave the facility.

A fourth aspect of the present invention provides an information providing center for sending and receiving information to and from multiple vehicles. The information providing center is configured to generate, for a vehicle leaving an off-street facility having multiple exits to enter a road, exit status information including information on an exit having a shortest exit time length based on vehicle-side information received from the vehicles having left the same facility within a predetermined period of time; and to send the generated exit status information to the vehicle leaving the facility to enter the road. The vehicle-side information includes information obtained based on starting time and exiting time of the vehicles and information identifying the exits selected for the vehicles to leave the facility.

According to the third aspect or the fourth aspect of the present invention, the information providing center may generate recent-information-based exit status information as the exit status information based on the vehicle-side information received within a predetermined period of time before the vehicle leaving the facility to enter the road starts to move.

According to the third aspect or the fourth aspect of the present invention, if it is not possible to generate the recent-information-based exit status information, the information providing center may generate statistical exit status information as the exit status information based on the vehicle-side information received previously in the same time range and associated with the same day factors.

According to the third aspect or the fourth aspect of the present invention, the information providing center may be configured to calculate the number of exiting vehicles currently leaving the facility; and to generate the exit status information based on the number of exiting vehicles calculated when the vehicle leaving the facility to enter the road starts to move.

According to the third aspect or the fourth aspect of the present invention, the information providing center may be configured to compare actual exit time lengths included in recent-information-based exit status information calculated based on the vehicle-side information received within a predetermined period of time before the vehicle leaving the facility to enter the road starts to move and shortest exit time lengths calculated based on the vehicle-side information received in the past; to generate information indicating whether the respective exits are congested based on the comparison results; and to send the generated information to the vehicle leaving the facility to enter the road.

A fifth aspect of the present invention provides an information providing system including the on-vehicle information providing device of the first aspect and the information providing center of the third aspect.

A sixth aspect of the present invention provides an information providing system including the on-vehicle information providing device of the second aspect and the information providing center of the fourth aspect.

A seventh aspect of the present invention provides an information providing system including the on-vehicle information providing device of the first aspect or the second aspect which is configured to provide information indicating whether each of the exits is congested; and the information providing center of the third aspect or the fourth aspect which is configured to send the information indicating whether each of the exits is congested.

Advantageous Effect of the Invention

Embodiments of the present invention provide an on-vehicle information providing device, an information providing center, and an information providing system that make it possible to provide information on time necessary for a vehicle to exit a parking lot or a facility for each of its multiple exits.

BRIEF DESCRIPTION OF THE DRAWINGS

FIG. 8A is a sequence chart showing a process of sending vehicle-side information;

FIG. 11A is a table showing number-of-exiting-vehicles management information to be generated for each facility;

FIG. 11B is a table showing parking history information;

FIG. 11C is a table showing average exit time length information relative to the number of exiting vehicles; and FIG. 12 is a sequence chart showing a process of sending vehicle-side information.

Figure 1:
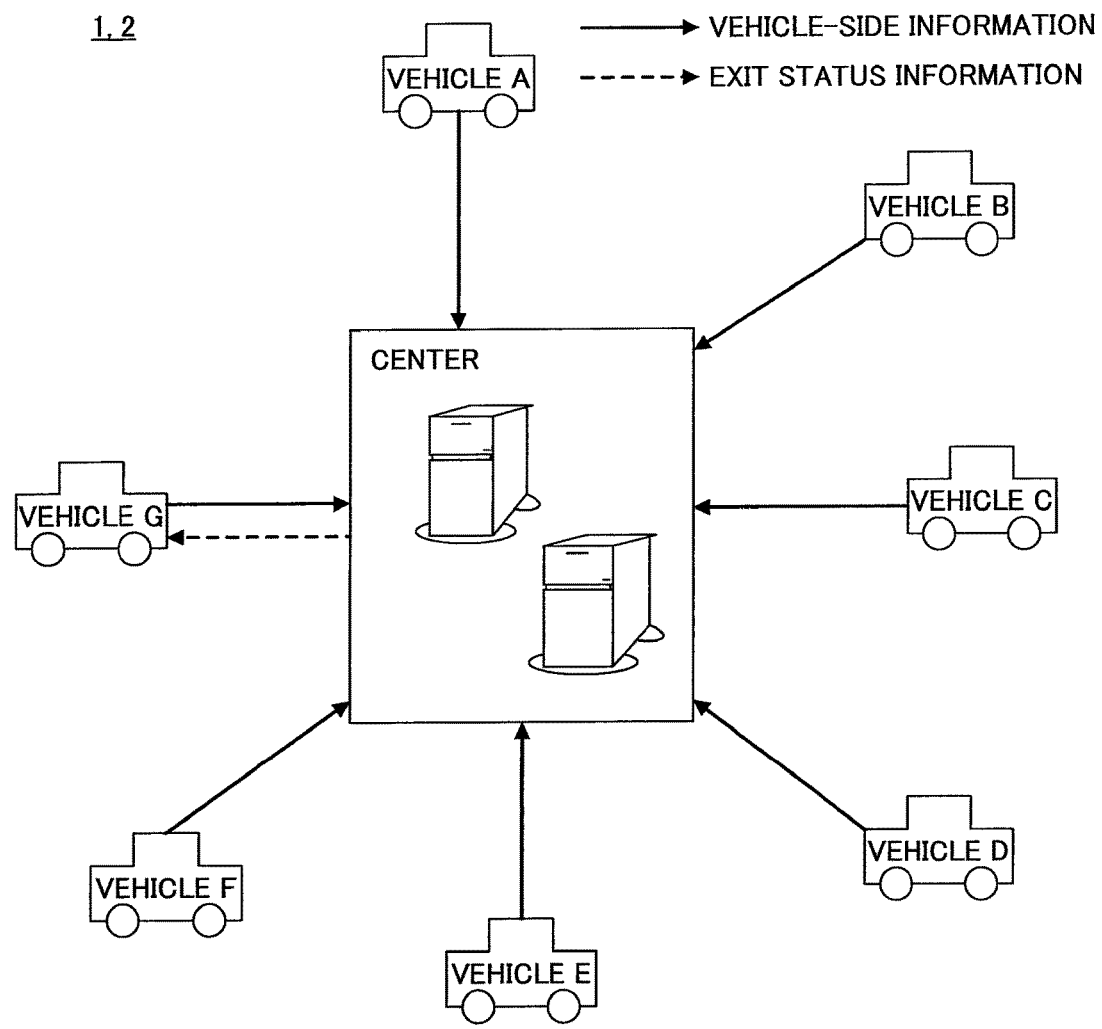
FIG. 1 is a schematic diagram illustrating a configuration of an information providing system 1.

EXPLANATION OF REFERENCES 1, 2 Information providing system
10 On-vehicle information providing device
20 GPS receiver
30 Memory
40 Input/output unit
50 Navigation computer
60 Vehicle-side communication unit
70 Radio base station
80 Network
100 Information providing center
110 Information processing device
120 Database

BEST MODE FOR CARRYING OUT THE INVENTION

Figure 2:
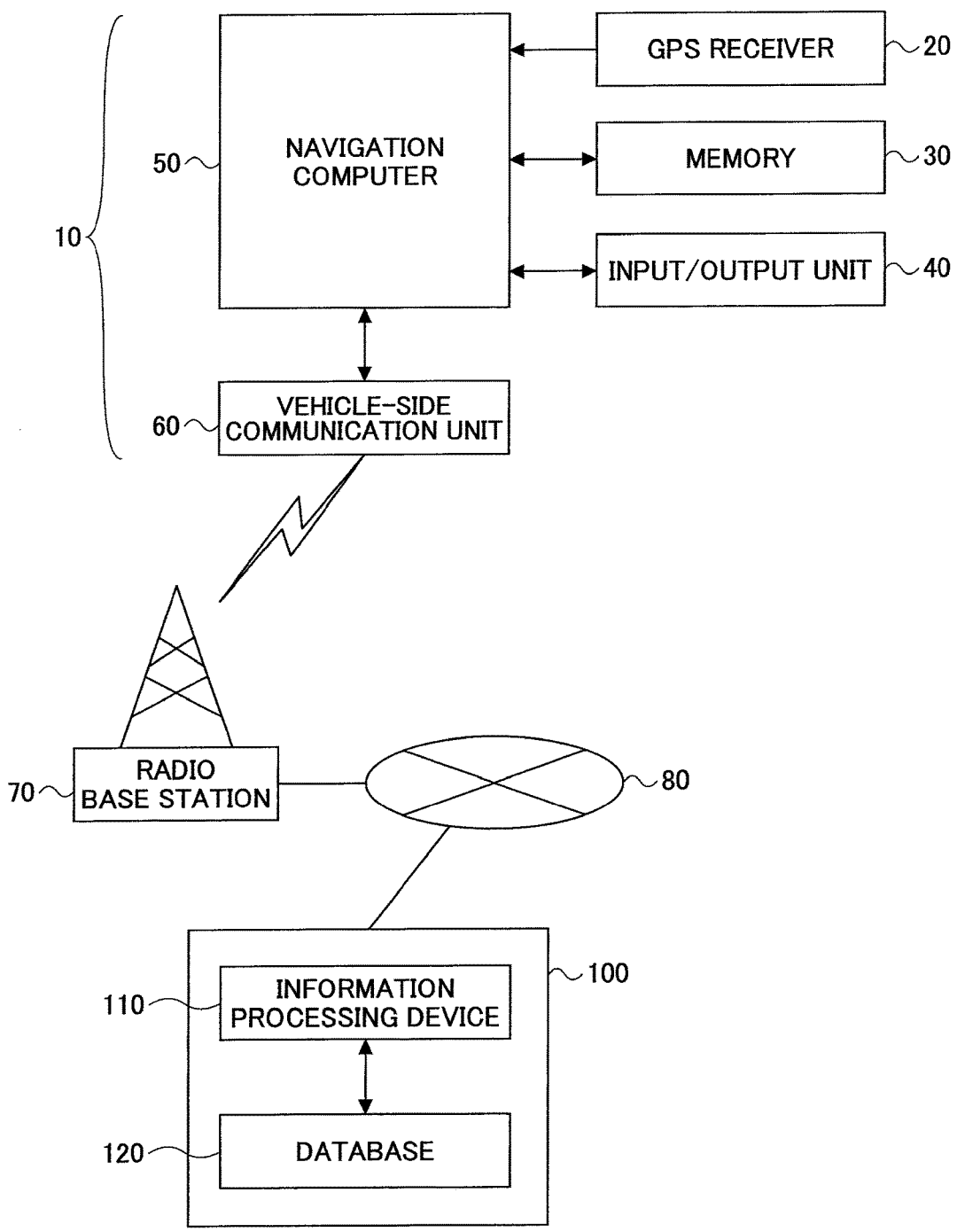
FIG. 2 is a drawing illustrating an on-vehicle information providing device 10 and an information providing center 100.

The best mode for carrying out the invention is described based on the following embodiments with reference to the accompanying drawings.
<First Embodiment>
An information providing system 1 according to a first embodiment of the present invention is described below.
[Configurations]
FIG. 1 is a schematic diagram illustrating a configuration of the information providing system 1. FIG. 2 is a drawing illustrating configurations of an on-vehicle information providing device 10 and an information providing center 100.

The information providing system 1 includes plural on-vehicle information providing devices 100 mounted on vehicles and the information providing center 100. Each vehicle uploads vehicle-side information, which is used by the information providing center 100 to generate exit status information, to the information providing center 100. The information providing center 100 accumulates the vehicle-side information sent from the vehicles to generate exit status information including exit time lengths (lengths of time required to exit) for respective exits and provides the generated exit status information to the vehicles.

The on-vehicle information providing device 10 is implemented as an on-vehicle navigation device and includes a GPS receiver 20, a memory 30, an input/output unit 40, a navigation computer 50, and a vehicle-side communication unit 60. The information providing center 100 includes an information processing device 110 and a database 120.

The GPS receiver 20 receives radio wave signals from GPS satellites including data indicating orbits and times of the satellites. The received data are sent to the navigation computer 50 and used to identify the current position of the vehicle.

The memory 30 is implemented by a storage medium such as a hard disk, a DVD, or a CD-ROM and stores map information. In the map information, roads are represented by nodes indicating intersections and links connecting the nodes. The memory 30 also stores facility IDs and coordinate areas (polygon data) of known facilities such as parking lots and buildings having multiple exits (gateways), and coordinates and IDs of the exits.

The input/output unit 40 is, for example, implemented by a touch panel display unit, a mike and a speaker for audio input and output, and a dedicated mechanical switch. The display unit displays images including videos using, for example, a video graphics array (VGA) system and identifies a position on its surface touched by a user by detecting a voltage change caused by the touch of the user. User input on the input/output unit 40 is sent to the navigation computer 50, and the navigation computer 50 determines contents to be output on the input/output unit 40.

The navigation computer 50 is implemented, for example, as a computer unit including a CPU, a ROM, and a RAM connected to each other via a bus. The navigation computer 50 may also include a storage medium such as a hard disk drive (HDD) or a digital versatile disk (DVD), an I/O port, a timer, and a counter. The ROM stores data and programs to be executed by the CPU. The navigation computer 50 performs calculations based on radio wave signals received by the GPS receiver 20 from GPS satellites and thereby determines the current position (latitude, longitude, and altitude) of the vehicle. The current position of the vehicle may be corrected based on outputs from sensors such as a speed sensor and a gyro sensor and/or information received by a beacon receiver and an FM multi-receiver. The navigation computer 50 generates the best route from the current position to a destination specified by the user on the input/output unit 40 by referring to the map information in the memory 30, and performs route guidance.

Also, as one of distinguishing features of the present invention, the navigation computer 50 sends vehicle-side information to the information providing center 100 and receives exit status information from the information providing center 100 via the vehicle-side communication unit 60, and provides information based on the exit status information. These processes are described later in more detail.

The vehicle-side communication unit 60 sends and receives information to and from the information providing center 100, for example, via a radio base station 70 and a network 80. The vehicle-side communication device 60 and the radio base station 70 wirelessly communicate with each other using, for example, a cell-phone network, a personal handy-phone system (PHS) network, a wireless LAN, a worldwide interoperability for microwave access (WiMAX) system, a satellite phone system, or a beacon. The network 80 connecting the radio base station 70 and the information providing center 100 is implemented, for example, by a wired network such as a public switched telephone network (PSTN), an integrated services digital network (ISDN), or a fiber optic network. For transmission and reception of data, a protocol, such as hypertext transfer protocol (HTTP), file transfer protocol (FTP), or multipurpose Internet mail extension (MIME), that is upward compatible with transmission control protocol/Internet protocol (TCP/IP) may be used. Alternatively, a beacon system or an FM multiplex broadcasting system may be used for communications between the vehicle-side communication unit 60 and the information providing center 100.

The information processing device 110 and the database 120 of the information providing center 100 can be implemented, respectively, by a known computer and a known storage medium. Therefore, their detailed descriptions are omitted.

[Processes]

In the information providing system 1 of this embodiment, the following two steps are performed in preparation to provide information on exit time lengths: sending vehicle-side information from the on-vehicle information providing device 10 to the center; and sending exit status information from the center to the on-vehicle information providing device 10.

(1-1 Sending Vehicle-Side Information)

Figure 3:
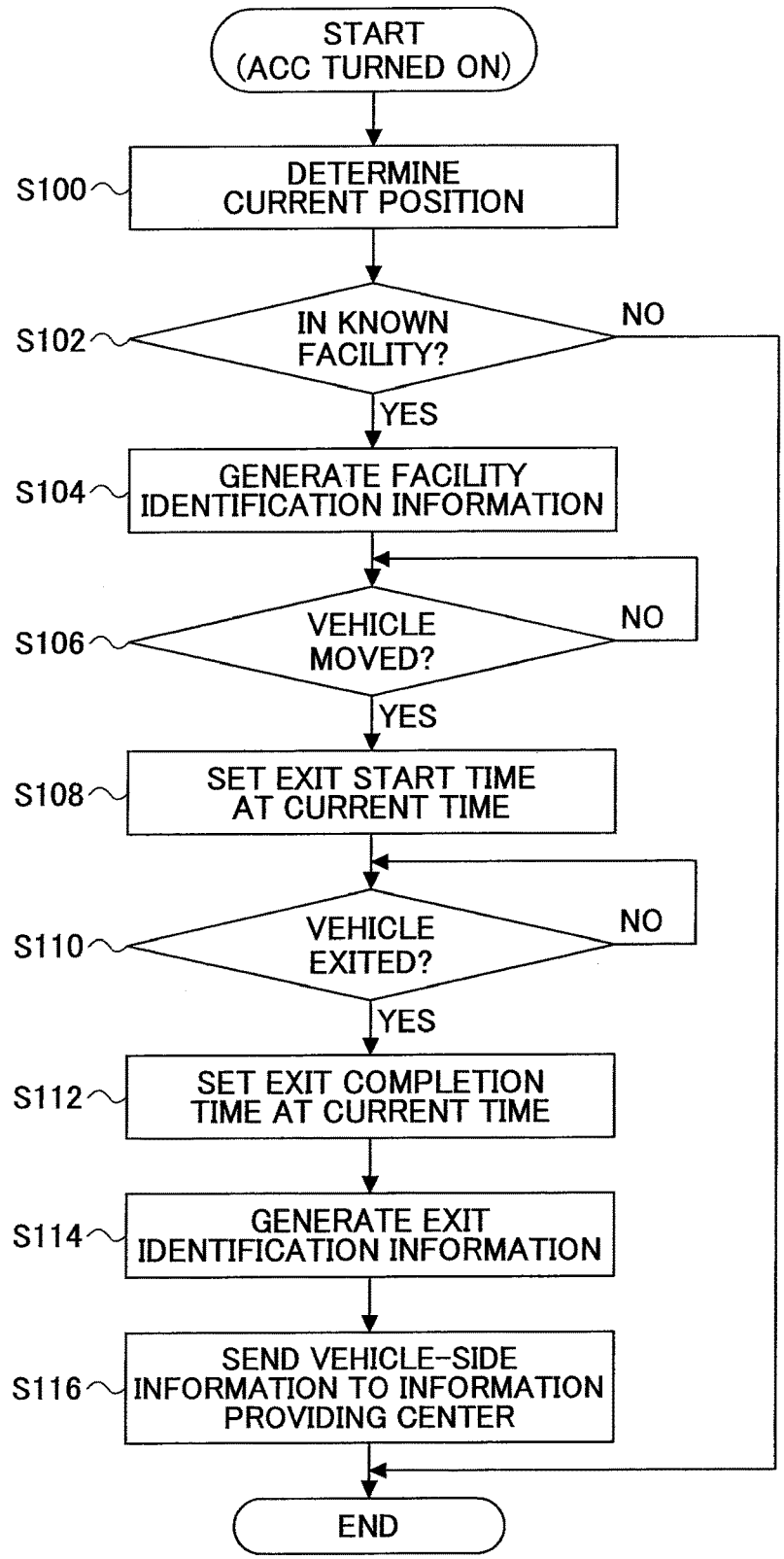
FIG. 3 is a flowchart showing a process of generating vehicle-side information by the on-vehicle information providing device 10.

FIG. 3 is a flowchart showing a process of generating vehicle-side information by the on-vehicle information providing device 10. This process is automatically started and performed by the navigation computer 50, for example, when the accessory (ACC) power is turned on (or the ignition is turned on, or the engine is started). Alternatively, this vehicle-side information providing process may be started and stopped by the user. The vehicle-side information includes facility identification information, exit start time, exit completion time, and exit identification information as information items. These information items are temporarily stored, for example, in an area of a RAM before being sent to the information providing center 100.

In FIG. 3, as described above, the navigation computer 50 performs calculations based on signals received by the GPS receiver 20 and thereby determines the current position of the vehicle (S100).

Next, the navigation computer 50 determines whether the current position of the vehicle is in any one of known facilities (S102). For example, the navigation computer 50 determines whether the current position of the vehicle is in any of the coordinate areas representing the facilities. If the current position of the vehicle is in none of the facilities, the navigation computer 50 terminates the process.

If the current position of the vehicle is in a known facility, the navigation computer 50 generates facility identification information (S104). The facility identification information includes, for example, a facility ID stored in the memory 30 or the current position of the vehicle.

After generating the facility identification information, the navigation computer 50 waits until the vehicle starts to move (S106). For example, the navigation computer 50 determines that the vehicle has moved if the speed of the vehicle is 1 km/h or higher for a predetermined period of time or if the vehicle has traveled a predetermined distance.

If the vehicle has moved, the navigation computer 50 sets exit start time (corresponds to "starting time" in claims) at the current time (S108).

Next, the navigation computer 50 waits until the vehicle leaves the facility (S110). Various criteria may be used to determine whether the vehicle has left the facility. For example, the navigation computer 50 determines that the vehicle has left the facility if the vehicle passes an exit link of the facility, if the vehicle passes an area centered around the coordinates of an exit, if the current position of the vehicle moves out of the coordinate area of the facility, or if the current position of the vehicle is on a road link.

If the vehicle has left the facility, the navigation computer 50 sets exit completion time (corresponds to "exiting time" in claims) at the current time (S112), and sets an exit number (or coordinates) of an exit used to leave the facility in exit identification information (S114).

Then, the navigation computer 50 sends vehicle-side information including the facility identification information, the exit start time, the exit completion time, and the exit identification information to the information providing center 100 (S116).

Here, instead of sending the exit start time and the exit completion time, the navigation computer 50 may be configured to send an actual exit time length obtained by subtracting the exit start time from the exit completion time to the information providing center 100.

(1-2 Generating and Sending Exit Status Information)

Figure 4:
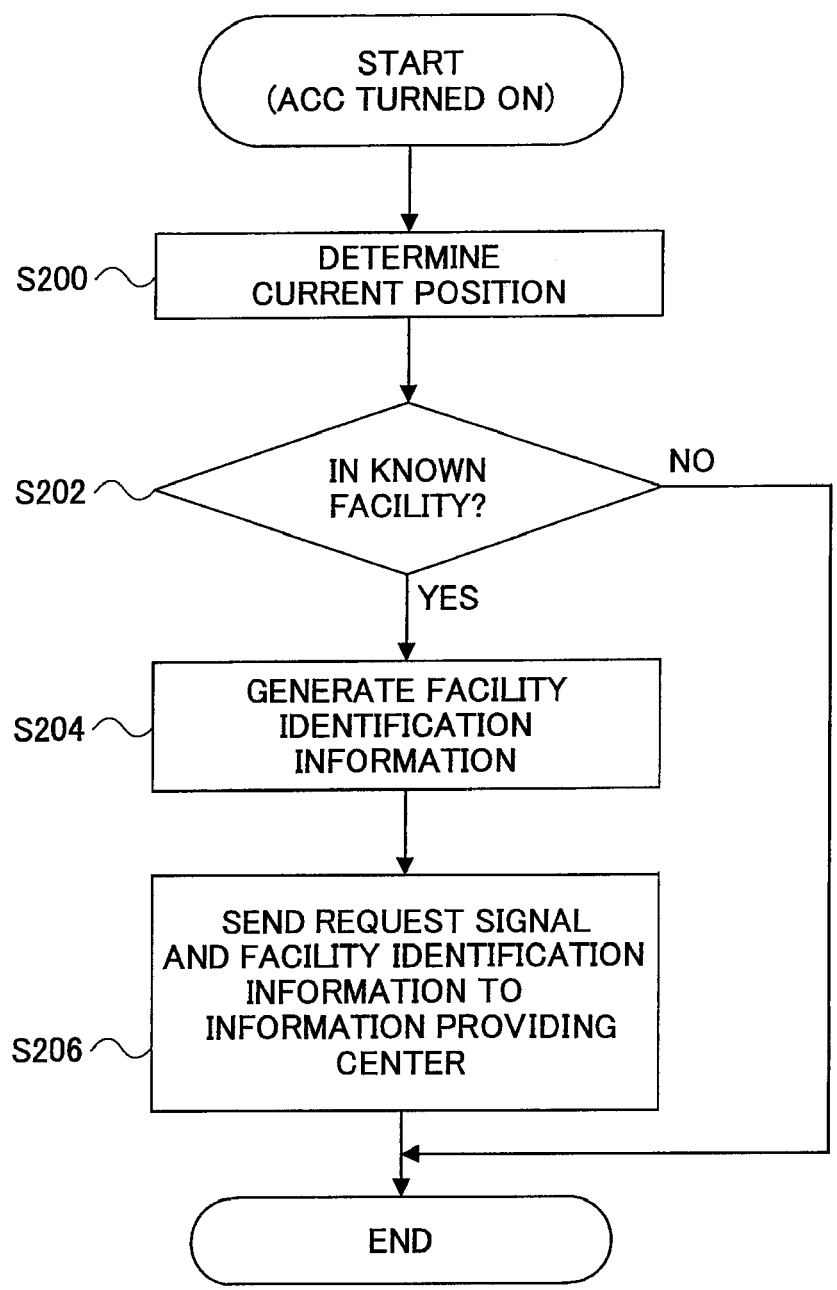
FIG. 4 is a flowchart showing a process of sending a request signal by the on-vehicle information providing device 10.

The information providing center 100 sends exit status information, for example, when a request signal is received from the on-vehicle information providing device 10. FIG. 4 is a flowchart showing a process of sending a request signal by the on-vehicle information providing device 10. This process is automatically started and performed by the navigation computer 50 when the accessory (ACC) power is turned on (or the ignition is turned on, or the engine is started). Alternatively, the on-vehicle information providing device 10 may be turned on and off by the user, and the process may be started by the user instead of being automatically started when the ACC power is turned on.

In FIG. 4, as described above, the navigation computer 50 performs calculations based on signals received by the GPS receiver 20 and thereby determines the current position of the vehicle (S200). Next, the navigation computer 50 determines whether the current position of the vehicle is in any one of known facilities (S202). If the current position of the vehicle is in a known facility, the navigation computer 50 generates facility-identification information (S204) and sends a request signal together with the facility-identification information to the information providing center 100 (S206).

Steps S200 through S204 are substantially the same as steps S100 through S104 in the flowchart shown in FIG. 3. Therefore, a step of sending a request signal to the information providing center 100 may be inserted between steps S104 and S106 in the flowchart shown in FIG. 3. In other words, the process of sending a request signal may be incorporated in the process of sending vehicle-side information.

The information processing device 110 of the information providing center 100 receives the vehicle-side information and stores the received vehicle-side information in the database 120. Also, when receiving a request signal from the on-vehicle information providing device 10, the information processing device 110 generates exit status information and sends the generated exit status information to the on-vehicle information providing device 10. Here, if the request signal is sent together with vehicle-side information, the information processing device 110 sends exit status information when receiving the vehicle-side information.

Figure 5:
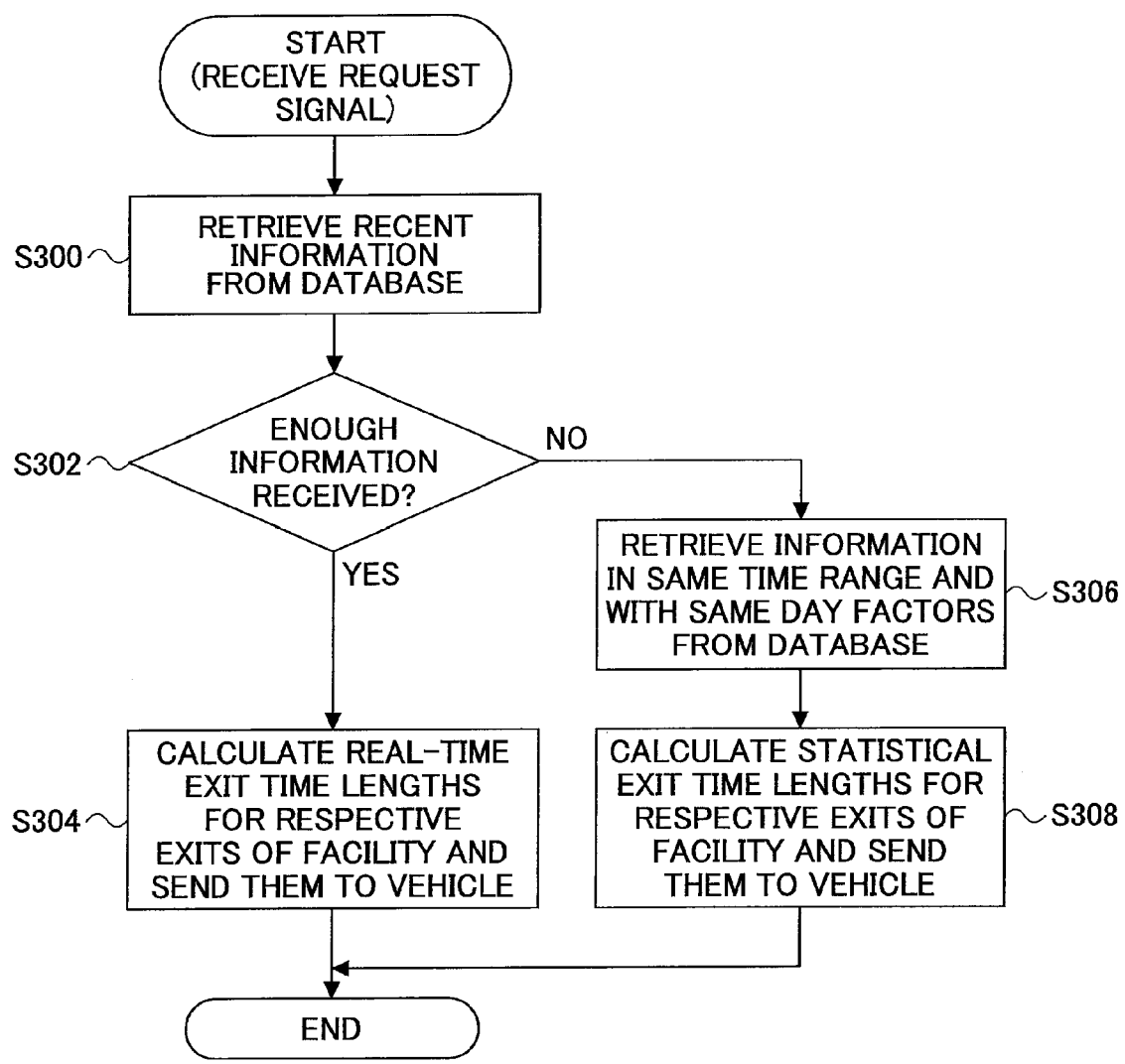
FIG. 5 is a flowchart showing a process, performed by an information processing device 110 of the information providing center 100, of calculating exit time lengths constituting a part of exit status information and sending the exit time lengths to the on-vehicle information providing device 10.

FIG. 5 is a flowchart showing a process, performed by the information processing device 110 of the information providing center 100, of calculating exit time lengths and sending the exit time lengths as the exit status information to the on-vehicle information providing device 10. This process is started when the information processing device 110 receives a request signal from the on-vehicle information providing device 10.

In FIG. 5, the information processing device 110 retrieves recent vehicle-side information related to a current facility (corresponding to facility identification information accompanying the request signal) from the database 120 (S300).

Here, "recent" indicates, for example, that the vehicle-side information has been received within a predetermined period of time (e.g., from several minutes to several tens of minutes) before the reception of the request signal.

Next, the information processing device 110 determines whether enough information has been retrieved to calculate exit time lengths for respective exits of the current facility (S302). "Enough information" indicates, for example, that at least one set of vehicle-side information has been retrieved for each exit.

If enough information has been retrieved, the information processing device 110 calculates, for each exit of the current facility, a real-time exit time length (corresponds to "recent-information-based exit status information" in claims) by obtaining an average (or a geometric average, or a center value) of actual exit time lengths each obtained by subtracting exit start time from exit completion time in the retrieved recent vehicle-side information. Then, the information processing device 110 sends the calculated real-time exit time lengths for the respective exits to the on-vehicle information providing device 10 (S304).

Meanwhile, if enough information has not been retrieved, the information processing device 110 retrieves previous vehicle-side information of the current facility which is received previously in the same time range and associated with the same day factors (day of the week, season, etc.) from the database 120 (S306). The information processing device 110 calculates, for each exit of the current facility, a statistical exit time length (corresponds to "statistical exit status information" in claims) by obtaining an average (or a geometric average, or a center value) of actual exit time lengths each obtained by subtracting exit start time from exit completion time in the retrieved previous vehicle-side information. Then, the information processing device 110 sends the calculated statistical exit time lengths for the respective exits to the on-vehicle information providing device 10 (S308).

Thus, if enough information has been received recently or within a predetermined period of time, exit time lengths are calculated based on the recent information; and if enough information has not been received within the predetermined period of time, exit time lengths are calculated based on previous information received previously in similar situations.

Figure 6:
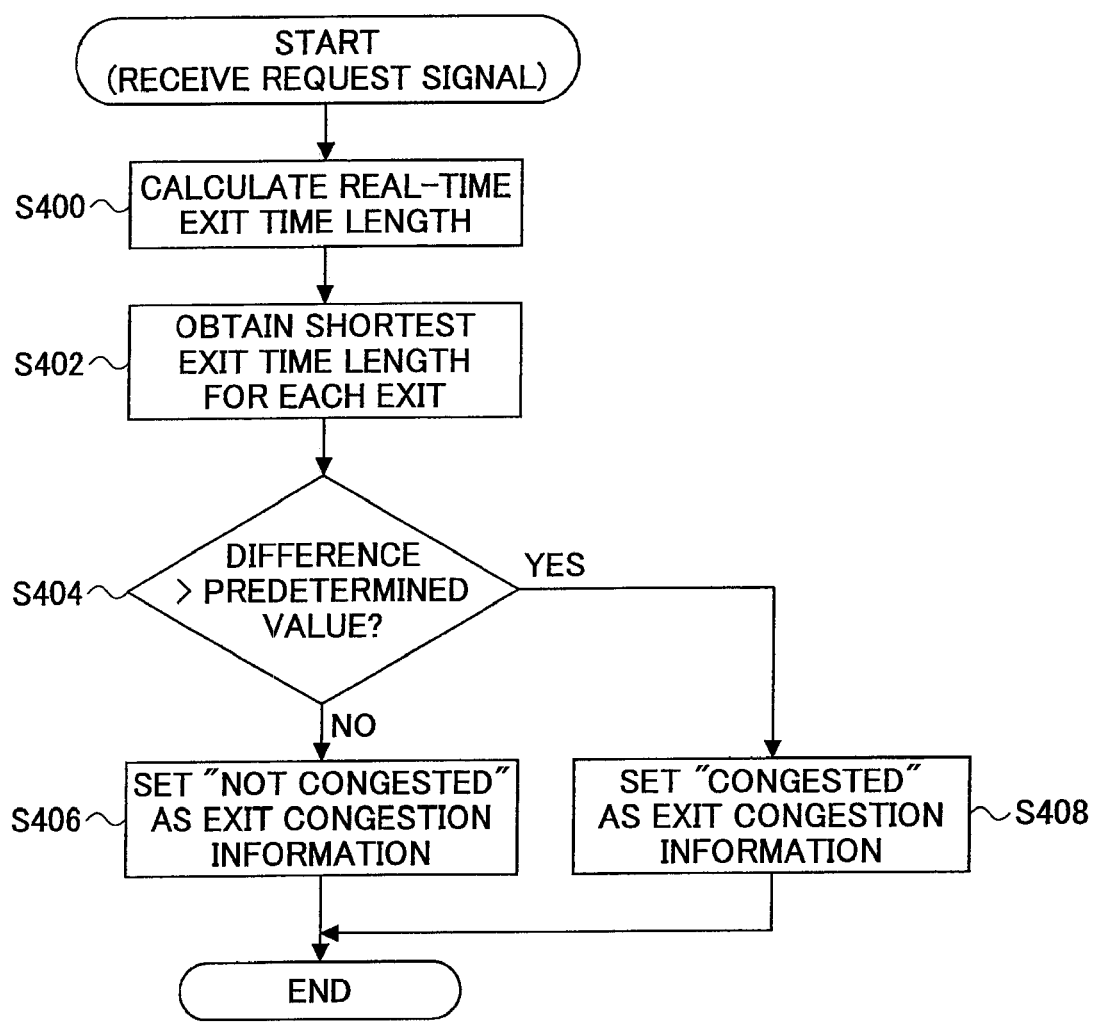
FIG. 6 is a flowchart showing a process of generating exit status information including information indicating whether respective exits are congested.

The exit status information may also include, for each exit, information indicating whether the exit is congested. FIG. 6 is a flowchart showing a process of generating exit status information including exit congestion information. This process may be performed concurrently with the process shown in FIG. 5 or may be incorporated in the process shown in FIG. 5.

In FIG. 6, the information processing device 110 calculates real-time exit time lengths for respective exits of the current facility as described in steps S300 and S304 of FIG. 5 (S400).

Next, the information processing device 110 calculates multiple actual exit time lengths for the respective exits using all sets of vehicle-side information related to the current facility, and selects the shortest one of the actual exit time lengths as the shortest exit time length for each of the exits (S402).

Then, the information processing device 110 calculates, for each exit, the difference between the real-time exit time length and the shortest exit time length and determines whether the difference is greater than a predetermined value T1 (S404).

If the difference is less than or equal to the predetermined value T1, the information processing device 110 sets "not congested" (indicating the exit is not congested) as exit congestion information and sends the exit congestion information to the on-vehicle information providing device 10 (S406). Meanwhile, if the difference is greater than the predetermined value T1, the information processing device 110 sets "congested" (indicating the exit is congested) as exit congestion information and sends the exit congestion information to the on-vehicle information providing device 10 (S408).

(1-3 Contents of Information Provided to Driver)

Based on received exit status information, the on-vehicle information providing device 10 provides information to the driver (or a passenger).

Figure 7A:
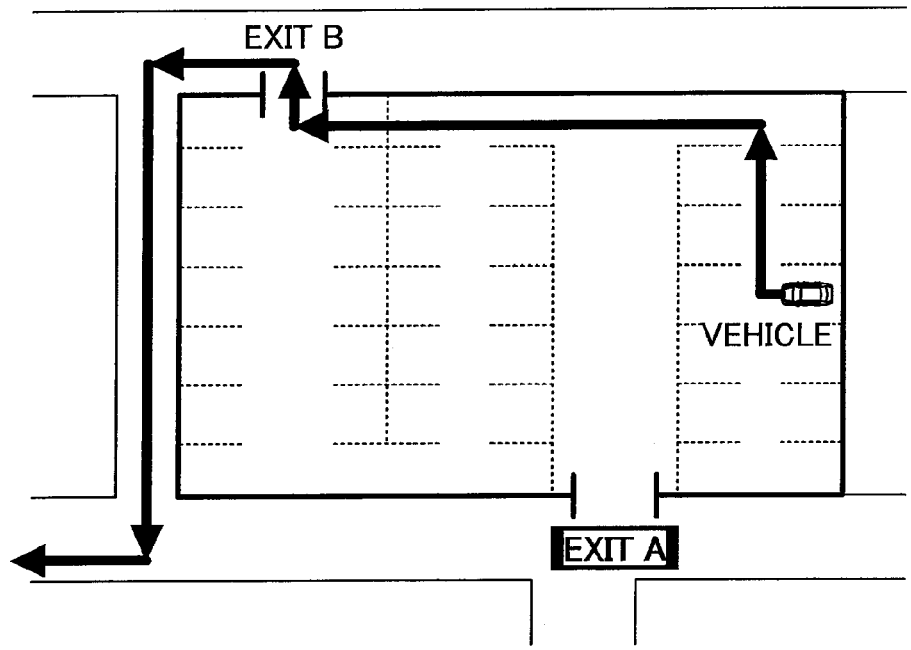
FIG. 7A is a drawing illustrating an exemplary information providing screen on a display device of an input/output unit 40.
Figure 7B:
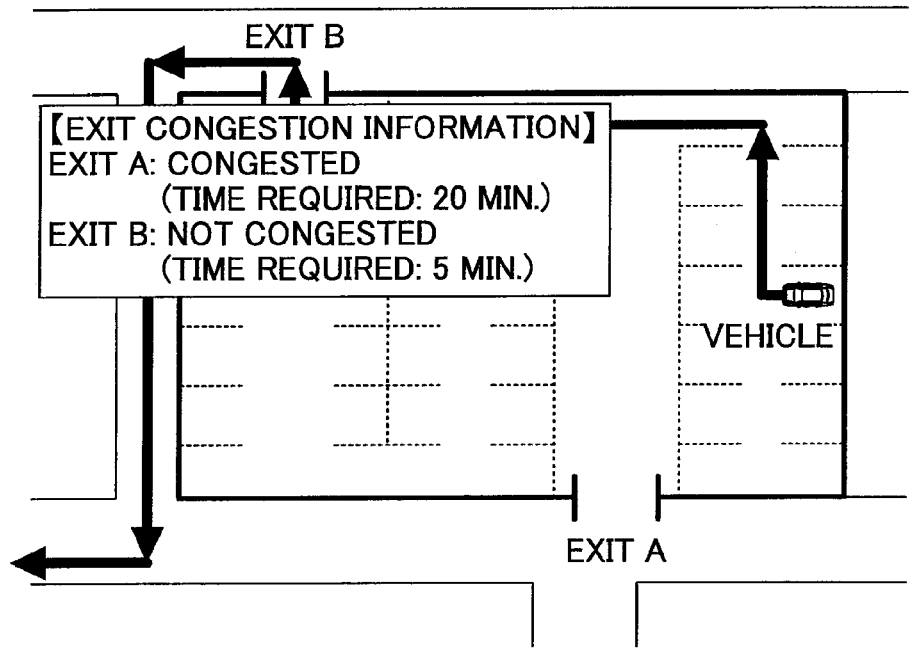
FIG. 7B is a drawing illustrating another exemplary information providing screen on the display device of the input/output unit 40.

FIGS. 7A and 7B show exemplary information providing screens on the display device of the input/output unit 40. In FIG. 7A, arrows are displayed to guide the vehicle to exit B with the shortest exit time length and congested exit A is highlighted. In FIG. 7B, exit time lengths (indicated by "Time required" in the figure) and congestion information are also displayed for the respective exits A and B. With the provided information, the driver can select an exit with a shorter time to leave the facility.

In this embodiment, the exit status information sent from the information providing center 100 includes exit time lengths for respective exits and the on-vehicle information providing device 10 selects the exit having the shortest exit time length. Alternatively, the information providing center 100 may be configured to select the exit having the shortest exit time length and to send information on the selected exit as the exit status information; and the on-vehicle information providing device 10 may be configured to just display the selected exit having the shortest exit time length.

The on-vehicle information providing device 10, the information providing center 100, and the information providing system 1 of this embodiment make it possible to provide information on time necessary for a vehicle to leave a parking lot or a facility for each of its multiple exits.

Figure 8B:
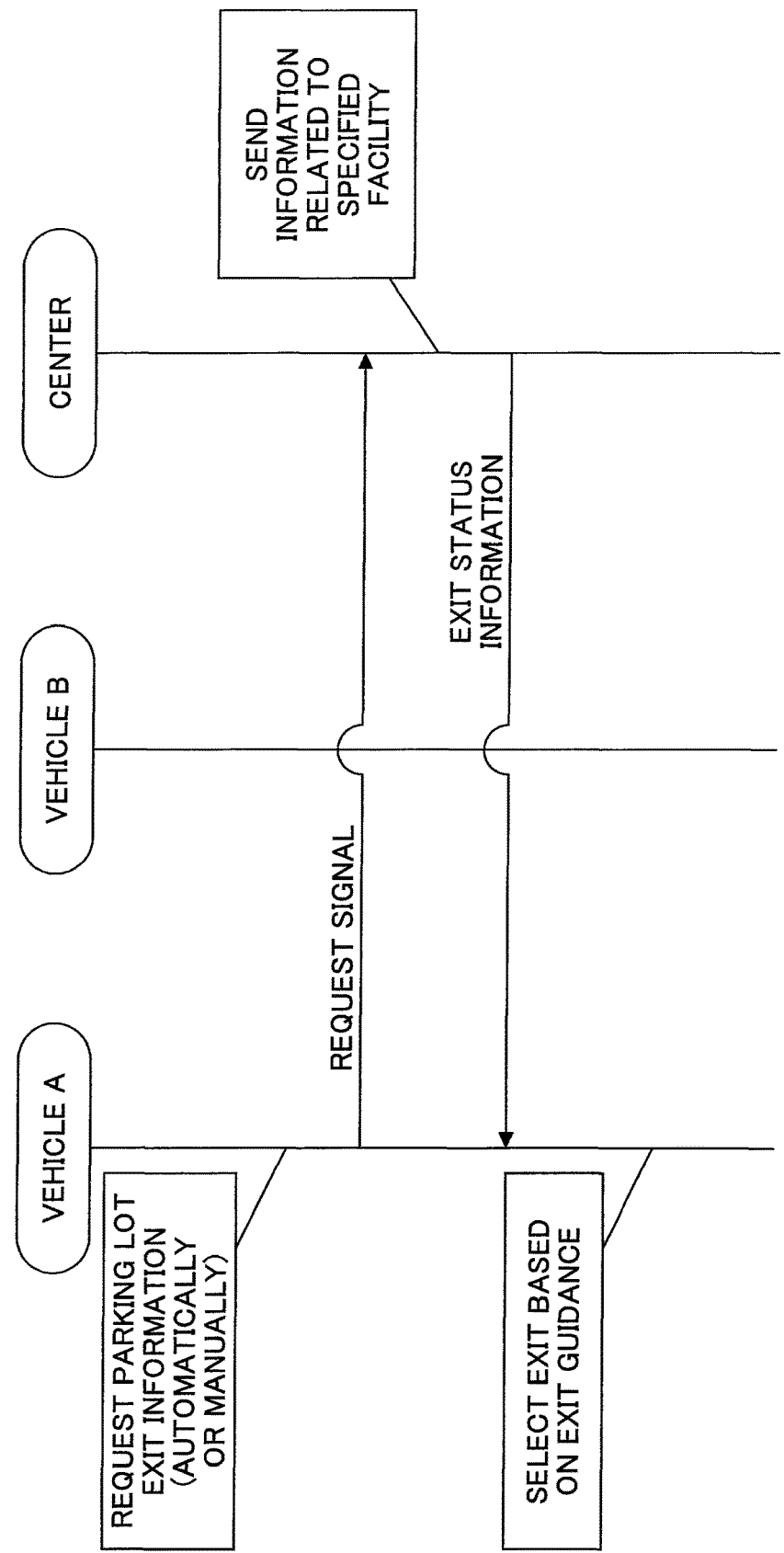
FIG. 8B is a sequence chart showing a process of sending exit status information.

FIG. 8A is a sequence chart showing a process of sending vehicle-side information; and FIG. 8B is a sequence chart showing a process of sending exit status information. In FIGS. 8A and 8B, it is assumed that a request signal is sent only from vehicle A.

<Second Embodiment>

An information providing system 2 according to a second embodiment of the present invention is described below.

[Configurations]

Similar to the first embodiment, the information providing system 2 of the second embodiment includes on-vehicle information providing devices 10 and an information providing center 100. Also, hardware configurations of the on-vehicle information providing device 10 and the information providing center 100 are substantially the same as those of the first embodiment. Therefore, the same reference numbers shown in FIGS. 1 and 2 are used for the corresponding hardware components of the on-vehicle information providing device 10 and the information providing center 100 of this embodiment, and their descriptions are omitted here.

[Processes]

In the information providing system 2 of this embodiment, the following two steps are performed in preparation to provide information on exit time lengths: sending vehicle-side information from the on-vehicle information providing device 10 to the center; and sending exit status information from the center to the on-vehicle information providing device 10.

(2-1 Transmitting Vehicle-Side Information)

Figure 9:
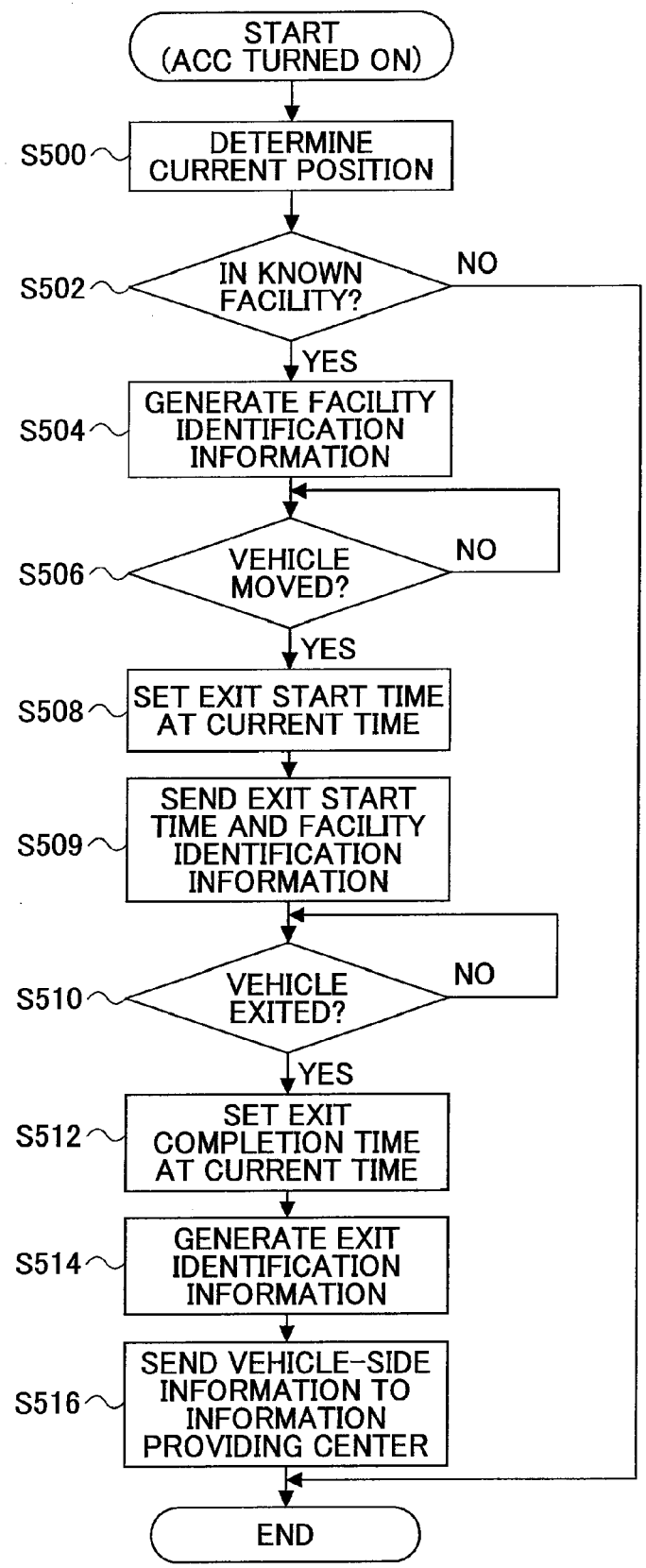
FIG. 9 is a flowchart showing a process of generating vehicle-side information by the on-vehicle information providing device 10 according to an embodiment of the present invention.

FIG. 9 is a flowchart showing a process of generating vehicle-side information by the on-vehicle information providing device 10 of the second embodiment. This process is automatically started and performed by the navigation computer 50, for example, when the accessory (ACC) power is turned on (or the ignition is turned on, or the engine is started). Alternatively, this vehicle-side information transmission process may be started and stopped by the user. The vehicle-side information includes facility identification information, exit start time, exit completion time, and exit identification information as information items. These information items are temporarily stored, for example, in an area of a RAM before being sent to the information providing center 100.

In FIG. 9, the navigation computer 50 performs calculations based on signals received by the GPS receiver 20 and thereby determines the current position of the vehicle (S500). Next, the navigation computer 50 determines whether the current position of the vehicle is in any one of known facilities (S502). If the current position of the vehicle is in a known facility, the navigation computer 50 generates facility identification information (S504) and waits until the vehicle starts to move (S506).

If the vehicle has moved, the navigation computer 50 sets exit start time at the current time (S508) and sends the facility identification information and the exit start time to the information providing center 100 (S509).

Thus, steps S500 through S508 are substantially the same as steps S100 through S108 described in the first embodiment with reference to FIG. 3. Therefore, detailed descriptions of steps S500 through S508 are omitted here.

After step S509, the navigation computer 50 waits until the vehicle leaves the facility (S510). If the vehicle has left the facility, the navigation computer 50 sets exit completion time at the current time (S512), sets an exit number (or coordinates) of an exit used to leave the facility in exit-identification information (S514), and sends the facility identification information, the exit start time, the exit completion time, and the exit identification information to the information providing center 100 (S516). Thus, in this embodiment, the vehicle-side information is sent in two steps, i.e., steps S509 and S516.

(2-2 Generating and Sending Exit Status Information)

The information providing center 100 sends exit status information, for example, when a request signal is received from the on-vehicle information providing device 10. The process of sending a request signal by the on-vehicle information providing device 10 is substantially the same as that of the first embodiment, and therefore its descriptions are omitted here. Also, as in the first embodiment, the process of sending a request signal may be incorporated in the process of sending vehicle-side information.

The information processing device 110 of the information providing center 100 receives the vehicle-side information and stores the received vehicle-side information in the database 120. Also, when receiving a request signal from the on-vehicle information providing device 10, the information processing device 110 generates exit status information and sends the generated exit status information to the on-vehicle information providing device 10. Here, if the request signal is sent together with vehicle-side information, the information processing device 110 sends exit status information when receiving the vehicle-side information.

Figure 10:
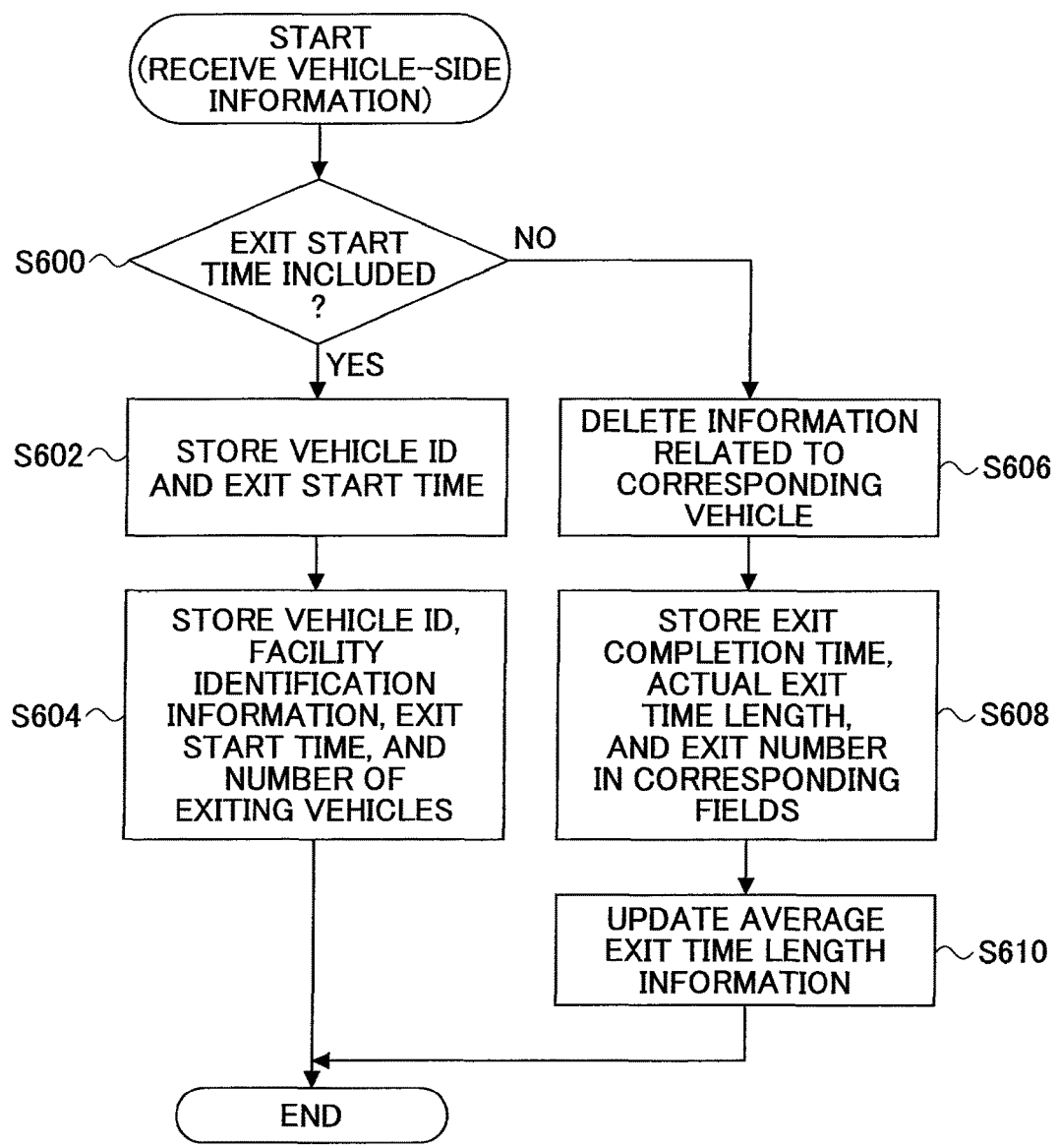
FIG. 10 is a flowchart showing a process performed, each time when vehicle-side information is received, by the information processing device 110 of the information providing center 100 according to an embodiment of the present invention.

In this embodiment, the information providing center 100 generates and sends exit status information when receiving a request signal. As a distinguishing feature of this embodiment, preparatory steps as described below are performed before generating exit status information. FIG. 10 is a flowchart showing a process performed, each time when vehicle-side information is received, by the information processing unit 110 of the information providing center 100 of this embodiment.

In FIG. 10, the information processing unit 110 determines whether received vehicle-side information includes exit start time (sent in S509 of FIG. 9) or exit completion time (sent in S516 of FIG. 9) (S600).

If the received vehicle-side information includes exit start time, the information processing unit 110 stores a vehicle ID and the exit start time in number-of-exiting-vehicles management information (see FIG. 11A) that is generated for each facility (S602).

Then, the information processing unit 110 stores the vehicle ID, the facility identification information, the exit start time, and the number of exiting vehicles in fields of parking history information (see FIG. 11B) (S604). The number of exiting vehicles is calculated based on the number-of-exiting-vehicles management information corresponding to the current facility.

Meanwhile, if the vehicle-side information includes exit completion time, the information processing unit 110 deletes information corresponding to the vehicle from the number-of-exiting-vehicles management information (S606).

Then, the information processing unit 110 searches the parking history information for a record with the corresponding vehicle ID, facility identification information, and exit start time, and stores the exit completion time, an actual exit time length, and an exit number in the corresponding fields of the record (S608).

After step S608, the information processing unit 110 updates average exit time length information relative to the number of exiting vehicles (see FIG. 11C) based on the newly added information in the parking history information.

The average exit time length information indicates the correlation between the numbers of exiting vehicles and exit time lengths for each exit of each facility. This correlation reflects the geometry of exit ways and surrounding roads, and therefore is highly reliable.

The average exit time length information and the number-of-exiting-vehicles management information are updated as needed and used as a data source of exit status information to be generated when a request signal is received. In this embodiment, when receiving a request signal including facility identification information, the information processing unit 110 obtains the number of vehicles currently leaving the facility based on the number-of-exiting-vehicles management information. Then, the information processing unit 110 retrieves exit time lengths corresponding to the obtained number of exiting vehicles for the respective exits and sends the exit time lengths as exit status information to the on-vehicle information providing device 10.

In the first embodiment, exit status information is generated using recent actual exit time lengths in preference to previous actual exit time lengths obtained previously in similar situations. If enough recent actual exit time lengths are not available, the previous actual exit time lengths are used. In either case, current exit time lengths are calculated based solely on time measurements obtained in the past. On the other hand, in the second embodiment, exit status information is generated taking into account the number of currently exiting vehicles. Therefore, the second embodiment provides more real-time estimates of exit time lengths.

The above process of the second embodiment may be combined with the process of calculating real-time exit time lengths described in the first embodiment. For example, if enough recent vehicle-side information is obtained, real-time exit time lengths are calculated as in the first embodiment; and if enough recent vehicle-side information is not obtained, exit time lengths are calculated according to the process of the second embodiment.

As in the first embodiment, the exit status information may also include, for each exit, information indicating whether the exit is congested. Details of generating exit congestion information are omitted here.

The information providing device 2 of this embodiment makes it possible to provide information on time necessary for a vehicle to leave a parking lot or a facility for each of its multiple exits.

FIG. 12 is a sequence chart showing a process of sending vehicle-side information.

An aspect of the present invention provides an information providing center for sending and receiving information to and from multiple vehicles. The information providing center is configured to generate, for a vehicle leaving an off-street facility having multiple exits to enter a road, exit status information including exit time lengths for the respective exits based on vehicle-side information received from the vehicles having left the same facility within a predetermined period of time, the vehicle-side information including information obtained based on starting time and exiting time of the vehicles and information identifying the exits selected for the vehicles to leave the facility; and to send the generated exit status information to the vehicle leaving the facility to enter the road.

According to another aspect of the present invention, the information providing center is configured to generate recent-information-based exit status information as the exit status information based on the vehicle-side information received within a predetermined period of time before the vehicle leaving the facility to enter the road starts to move.

According to another aspect of the present invention, if it is not possible to generate the recent-information-based exit status information, the information providing center is configured to generate statistical exit status information as the exit status information based on the vehicle-side information received previously in the same time range and associated with the same day factors.

According to another aspect of the present invention, the information providing center is configured to calculate the number of exiting vehicles currently leaving the facility; and to generate the exit status information based on the number of exiting vehicles calculated when the vehicle leaving the facility to enter the road starts to move.

According to still another aspect of the present invention, the information providing center is configured to compare actual exit time lengths included in recent-information-based exit status information calculated based on the vehicle-side information received within a predetermined period of time before the vehicle leaving the facility to enter the road starts to move and shortest exit time lengths calculated based on the vehicle-side information received in the past; to generate information indicating whether the respective exits are congested based on the comparison results; and to send the generated information to the vehicle leaving the facility to enter the road.

An aspect of the present invention provides an information providing center for sending and receiving information to and from multiple vehicles. The information providing center is configured to generate, for a vehicle leaving an off-street facility having multiple exits to enter a road, exit status information including information on an exit having a shortest exit time length based on vehicle-side information received from the vehicles having left the same facility within a predetermined period of time, the vehicle-side information including information obtained based on starting time and exiting time of the vehicles and information identifying the exits selected for the vehicles to leave the facility; and to send the generated exit status information to the vehicle leaving the facility to enter the road.

According to another aspect of the present invention, the information providing center is configured to generate recent-information-based exit status information as the exit status information based on the vehicle-side information received within a predetermined period of time before the vehicle leaving the facility to enter the road starts to move.

According to another aspect of the present invention, if it is not possible to generate the recent-information-based exit status information, the information providing center is configured to generate statistical exit status information as the exit status information based on the vehicle-side information received previously in the same time range and associated with the same day factors.

According to another aspect of the present invention, the information providing center is configured to calculate the number of exiting vehicles currently leaving the facility; and to generate the exit status information based on the number of exiting vehicles calculated when the vehicle leaving the facility to enter the road starts to move.

According to still another aspect of the present invention, the information providing center is configured to compare actual exit time lengths included in recent-information-based exit status information calculated based on the vehicle-side information received within a predetermined period of time before the vehicle leaving the facility to enter the road starts to move and shortest exit time lengths calculated based on the vehicle-side information received in the past; to generate information indicating whether the respective exits are congested based on the comparison results; and to send the generated information to the vehicle.

An aspect of the present invention provides an information providing system including any combination of on-vehicle information providing devices and information providing centers according to embodiments of the present invention.

[Others]

The present invention is not limited to the specifically disclosed embodiments, and variations and modifications may be made without departing from the scope of the present invention.

The present application claims priority from Japanese Patent Application No. 2007-016806 filed on Jan. 26, 2007, the entire contents of which are hereby incorporated herein by reference.

The invention claimed is:

1. An information providing system, comprising:
an on-vehicle information providing device; and
an information providing center, wherein
when a vehicle leaves an off-street facility having multiple exits to enter a road, the on-vehicle information providing device is configured:
to perform a first process of sending own vehicle-side information, including a starting time when the vehicle starts to move from a current position and an exiting time when the vehicle leaves the facility, and exit identification information identifying one of the exits selected for the vehicle to leave the facility, to the information providing center;
the information providing center is configured:
to generate recent-information-based exit status information for the vehicle leaving the facility based on other vehicle-side information received from multiple vehicles having left the same facility within a predetermined period of time before the vehicle leaving the facility starts to move,
the other vehicle-side information including starting times when the vehicles have started to move from current positions, exiting times when the vehicles have left the facility, and exit identification information identifying the exits selected for the vehicles to leave the facility,
the recent-information-based exit status information including actual exit time lengths for the respective exits that are calculated based on the other vehicle-side information;
the on-vehicle information providing device is configured to also perform a second process of:
receiving the recent-information-based exit status information from the information providing center,
identifying an exit having a shortest actual exit time length based on the actual exit time lengths in the recent-information-based exit status information,
determining whether each of the exits is congested based on a difference between the shortest actual exit time length and a real-time exit time length that is calculated based on the actual exit time lengths for each of the exits, and
providing information to a driver whether each of the exits is congested.

2. The information providing system as claimed in claim 1, wherein
the on-vehicle information providing device is configured to further perform a third process of sending a request signal to the information providing center to request the recent-information-based exit status information to be received in the second process;
at least one of the first process and the third process includes a step of sending the information providing center facility identification information identifying the facility that the vehicle is to leave; and
the recent-information-based exit status information is generated by the information providing center through a retrieval process based on the facility identification information.

3. The information providing system as claimed in claim 1, wherein the on-vehicle information providing device is configured such that one or both of the first process and the second process can be started and stopped by user operations.

4. The information providing system as claimed in claim 1, wherein
when the other vehicle-side information sufficient to generate the recent-information-based exit status information is not received from the vehicles within the predetermined period of time, the information providing center is configured to
generate statistical exit status information including statistical exit time lengths based on the vehicle-side information received previously in a same time range as a current time and associated with same day factors as a present day, and
send the statistical exit status information to the vehicle.

5. An information providing system, comprising:
an on-vehicle information providing device; and
an information providing center, wherein
when a vehicle leaves an off-street facility having multiple exits to enter a road, the on-vehicle information providing device is configured:
to perform a first process of sending own vehicle-side information, including an actual exit time length calculated based on a starting time when the vehicle starts to move from a current position and an exiting time when the vehicle leaves the facility, and exit identification information identifying one of the exits selected for the vehicle to leave the facility, to the information providing center;
the information providing center is configured:
to generate recent-information-based exit status information for the vehicle leaving the facility based on other vehicle-side information received from multiple vehicles having left the same facility within a predetermined period of time before the vehicle leaving the facility starts to move,
the other vehicle side information including actual exit time lengths for the respective exits that are calculated based on starting times when the vehicles have started to move from current positions and exiting times when the vehicles have left the facility, and exit identification information identifying the exits selected for the vehicles to leave the facility,
the recent-information-based exit status information including information on an exit having a shortest actual exit time length that is calculated based on the actual exit time lengths in the other vehicle-side information;
the on-vehicle information providing device is configured to also perform a second process of:
receiving the recent-information-based exit status information from the information providing center,
determining whether each of the exits is congested based on a difference between the shortest actual exit time length in the recent-information-based exit status information and a real-time exit time length that is calculated based on the actual exit time lengths for each of the exits, and
providing information to the driver whether each of the exits is congested.

6. The information providing system as claimed in claim 5, wherein
the on-vehicle information providing device is configured to further perform a third process of sending a request signal to the information providing center to request the recent-information-based exit status information to be received in the second process;
at least one of the first process and the third process includes a step of sending facility identification information identifying the facility that the vehicle is to leave, to the information providing center; and
the recent-information-based exit status information is generated by the information providing center through a retrieval process based on the facility identification information.

7. The information providing system as claimed in claim 5, wherein the on-vehicle information providing device is configured such that one or both of the first process and the second process can be started and stopped by user operations.

8. The information providing system as claimed in claim 5, wherein when the other vehicle-side information sufficient to generate the recent-information-based exit status information is not received from the vehicles within the predetermined period of time, the information providing center is configured to generate statistical exit status information including statistical exit time lengths based on the other vehicle-side information received previously in a same time range as a current time and associated with same day factors as a present day, and send the statistical exit status information to the vehicle.

9. An information providing center for sending and receiving information to and from multiple vehicles, wherein the information providing center is configured:

to generate recent-information-based exit status information for a vehicle leaving an off-street facility having multiple exits to enter a road, based on vehicle-side information received from the vehicles having left the same facility within a predetermined period of time before the vehicle leaving the facility to enter the road starts to move, the vehicle-side information including starting times when the vehicles have started to move from current positions, exiting times when the vehicles have left the facility, and exit identification information identifying the exits selected for the vehicles to leave the facility, the recent-information-based exit status information including actual exit time lengths for the respective exits that are calculated based on the vehicle-side information;

to identify an exit having a shortest actual exit time length based on the actual exit time lengths in the recent-information-based exit status information, to determine whether each of the exits is congested based on a difference between the shortest actual exit time length and a real-time exit time length that is calculated based on the actual exit time lengths for each of the exits, and to send information to the vehicle leaving the facility to enter the road whether each of the exits is congested.

10. The information providing center as claimed in claim 9, wherein when the vehicle-side information sufficient to generate the recent-information-based exit status information is not received from the vehicles within the predetermined period of time, the information providing center is configured to generate statistical exit status information including statistical exit time lengths based on the vehicle-side information received previously in a same time range as a current time and associated with same day factors as a present day, and send the statistical exit status information to the vehicle.

11. An information providing center for sending and receiving information to and from multiple vehicles, wherein the information providing center is configured:

to generate recent-information-based exit status information for a vehicle leaving an off-street facility having multiple exits to enter a road based on vehicle-side information received from the vehicles having left the same facility within a predetermined period of time before the vehicle leaving the facility to enter the road starts to move, the vehicle-side information including actual exit time lengths for the respective exits that are calculated based on starting times when the vehicles have started to move from current positions and exiting times when the vehicles have left the facility, and exit identification information identifying the exits selected for the vehicles to leave the facility, the recent-information-based exit status information including information on an exit having a shortest actual exit time length that is calculated based on the actual exit time lengths in the vehicle-side information;

to determine whether each of the exits is congested based on a difference between the shortest actual exit time length and a real-time exit time length that is calculated based on the actual exit time lengths for each of the exits, and to send information to the vehicle leaving the facility to enter the road whether each of the exits is congested.

12. The information providing center as claimed in claim 11, wherein when the vehicle-side information sufficient to generate the recent-information-based exit status information is not received from the vehicles within the predetermined period of time, the information providing center is configured to generate statistical exit status information including statistical exit time lengths based on the vehicle-side information received previously in a same time range as a current time and associated with same day factors as a present day, and send the statistical exit status information to the vehicle.

* * * * *